United States Patent
Lee et al.

(10) Patent No.: US 8,532,696 B2
(45) Date of Patent: Sep. 10, 2013

(54) MOBILE TERMINAL HAVING FLEXIBLE PRINTED CIRCUIT BOARD

(75) Inventors: In Taek Lee, Gyeonggi-do (KR); Jeong Nam Cheon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 627 days.

(21) Appl. No.: 12/755,604

(22) Filed: Apr. 7, 2010

(65) Prior Publication Data

US 2010/0273539 A1    Oct. 28, 2010

(30) Foreign Application Priority Data

Apr. 22, 2009   (KR) .................. 10-2009-0034963

(51) Int. Cl.
*H04B 1/38* (2006.01)
*H04M 1/00* (2006.01)
*H04M 9/00* (2006.01)

(52) U.S. Cl.
USPC .............. 455/550.1; 455/575.1; 455/90.3; 379/428.01

(58) Field of Classification Search
USPC ............ 455/425, 550.1, 575.1, 575.4, 90.3, 455/128, 347, 348; 379/428.01
See application file for complete search history.

(56) References Cited

U.S. PATENT DOCUMENTS

| | | | |
|---|---|---|---|
| 6,879,849 B2 * | 4/2005 | Begic | 455/575.7 |
| 8,107,235 B2 * | 1/2012 | Yeh | 361/679.56 |
| 8,260,382 B2 * | 9/2012 | Yoo et al. | 455/575.4 |
| 2005/0113154 A1 * | 5/2005 | Park et al. | 455/575.4 |
| 2006/0252471 A1 * | 11/2006 | Pan | 455/575.4 |
| 2008/0064455 A1 * | 3/2008 | Joo et al. | 455/575.4 |
| 2008/0103655 A1 * | 5/2008 | Turnbull et al. | 701/33 |
| 2008/0132284 A1 * | 6/2008 | Ryu et al. | 455/566 |
| 2009/0029741 A1 * | 1/2009 | Satou et al. | 455/566 |
| 2009/0247247 A1 * | 10/2009 | Jang | 455/575.4 |
| 2009/0263140 A1 * | 10/2009 | Kagaya | 398/139 |
| 2010/0048156 A1 * | 2/2010 | Hahn | 455/296 |
| 2010/0137042 A1 * | 6/2010 | Na et al. | 455/575.5 |
| 2011/0003622 A1 * | 1/2011 | Hwang | 455/575.1 |

FOREIGN PATENT DOCUMENTS

| | | |
|---|---|---|
| EP | 2043335 | 4/2009 |
| WO | WO 2009/139597 | 11/2009 |

OTHER PUBLICATIONS

Collins, Brian; Patent Application Publication No. US 2007/0243913 A1; Publication Date: Oct. 18, 2007; "Mobile Telephone Headset Wit Capacitive Radio Frequency Path . . . ,".

* cited by examiner

*Primary Examiner* — Andrew Wendell
(74) *Attorney, Agent, or Firm* — Cha-Reiter, LLC (57) ABSTRACT

A mobile terminal having a flexible printed circuit board (FPCB) is includes: a first main body having a first electronic circuit board therein; a second main body slidably connected to the first main body and having a second electronic circuit board therein; a FPCB for transferring an electronic signal by electrically connecting the first electronic circuit board and the second electronic circuit board; and a ground extension portion connected to one end of the FPCB connected to the first electronic circuit board, having a ground layer connected to a ground line of the FPCB therein, and connected to a noise shielding portion for shielding noise generated from one or more electronic components mounted on the first electronic circuit board. By extending the ground, the influences of noise and static electricity is minimized on an electronic circuit board mounted on the electronic components.

18 Claims, 6 Drawing Sheets

MOBILE TERMINAL HAVING FLEXIBLE PRINTED CIRCUIT BOARD

CLAIM OF PRIORITY

This application claims priority from and the benefit of Korean Patent Application No. 10-2009-0034963 filed in the Korean Intellectual Property Office on Apr. 22, 2009, the contents of which are incorporated herein by reference in its entirety.

BACKGROUND OF THE INVENTION

1. Field of the Invention

The present invention relates to a mobile terminal. More particularly, the present invention relates to a mobile terminal having a flexible printed circuit board and problems associated with their manufacture.

2. Description of the Related Art

In general, a mobile terminal is an electronic device that permits a user to access functions such as wireless communication, network connection, and digital broadcasting reception almost regardless of time and location. Recent mobile terminals have been developed to perform a communication function and functions such as Internet connection, digital broadcasting reception, document writing, and game playing. Even with the increased functionality provided therein, the more recent mobile terminals have gradually decreased in size and thickness while having an increased function according to a user's request.

An electronic circuit board for mounting many electronic components is installed within the mobile terminal, and such an electronic circuit board transmits and receives an electrical signal to and from a function module such as a display unit or a camera unit of the mobile terminal. As a size of the typical mobile terminal manufactured gradually decreases when compared to older models, an electrical signal including various data can be transmitted and received by connecting an electronic circuit board and a display unit or a camera unit using a flexible printed circuit board (hereinafter, a FPCB) in order to effectively use internal space thereof.

More recent mobile terminal adapt a display unit or a camera unit of a high specification in addition to the other functionality, and thus a data transfer amount between an electronic circuit board and a display unit or a camera unit increases, and because an operational frequency of data is extended to a relatively high frequency range, radiation performance and electrostatic discharge (ESD) performance of the mobile terminal are seriously deteriorated.

Further, in the FPCB, because only a ground line formed in a pattern form exists, and a path for separately bypassing noise and ESD surge having an influence on radiation performance is not provided, a shielding effect of the FPCB for shielding noise and ESD surge is also seriously deteriorated. Particularly, because an ESD surge has an immediate impact on the ground formed in the electronic circuit board, there is a high possibility that peripheral electronic components may be damaged from the ESD.

Therefore, a mobile terminal having a FPCB that can improve radiation performance and ESD performance of the mobile terminal by extending the ground of the FPCB is desirous.

SUMMARY OF THE INVENTION

The present invention provides a mobile terminal having a FPCB that improves radiation performance and ESD performance of the mobile terminals by extending the ground of the FPCB.

The present invention is not limited to the above-described objects and other aspects that will be understood by those skilled in the art from the following description.

In accordance with an exemplary aspect of the present invention, a mobile terminal having a FPCB includes: a first main body having a first electronic circuit board arranged therein; a second main body movably (slidably) connected to the first main body and having a second electronic circuit board arranged therein; a FPCB electrically coupling the first electronic circuit board and the second electronic circuit board for transferring an electronic signal there between; and a ground extension portion in contact with one end of the FPCB electrically coupled to the first electronic circuit board, having a ground layer connected to a ground line of the FPCB therein, and in contact with a noise shielding portion for shielding noise generating from one or more electronic components mounted on the first electronic circuit board.

In accordance with an exemplary aspect of the present invention, a mobile terminal comprising: a first main body having a first electronic circuit board arranged therein; a second main body movably connected to the first main body and having a second electronic circuit board arranged therein; a FPCB electrically coupling the first electronic circuit board and the second electronic circuit board for transferring an electronic signal there between; and a ground extension portion in contact with one end of the FPCB electrically coupled to the first electronic circuit board, said ground extension portion having a ground layer connected to a ground line of the FPCB therein, and in contact with a noise shielding portion for shielding noise generated from one or more electronic components mounted on the first electronic circuit board, wherein the mobile terminal comprises one of a folder-type mobile terminal, rotating-type mobile terminal, or a combination-type mobile terminal thereof.

BRIEF DESCRIPTION OF THE DRAWINGS

The exemplary objects, features and advantages of the present invention will become more apparent from the following detailed description in conjunction with the accompanying drawings, in which.

DETAILED DESCRIPTION

Hereinafter, exemplary embodiments of the present invention are described in detail with reference to the accompanying drawings.

Detailed descriptions of well-known functions and structures incorporated herein may be omitted to avoid obscuring the subject matter of the present invention.

The views in the drawings are not intended to be to scale or correctly proportioned. While the present invention may be embodied in many different forms, specific exemplary embodiments of the present invention are shown in drawings and are described herein in detail, with the understanding that the present disclosure is to be considered as an exemplification of the principles of the invention and is not intended to limit the invention to the specific embodiments illustrated. The same reference numbers are used throughout the drawings to refer to the same or like parts.

Hereinafter, a mobile terminal having a FPCB according to exemplary embodiments of the present invention will now be described with reference to the accompanying drawings.

In the following description, for convenience of description, a mobile terminal according to the present invention is described as a "mobile communication terminal", however the present invention is not limited thereto. That is, the mobile terminal having a FPCB according to the present exemplary embodiment may comprise an information and communication device, or a multimedia device such as a mobile communication terminal, mobile phone, personal digital assistant (PDA), smart phone, International Mobile Telecommunication 2000 (IMT-2000) terminal, code division multiple access (CDMA) terminal, wideband code division multiple access (WCDMA) terminal, Global System for Mobile Communication (GSM) terminal, general packet radio service (GPRS) terminal, enhanced data GSM environment (EDGE) terminal, universal mobile telecommunication service (UMTS) terminal, digital broadcasting terminal, and applications thereof.

Figure 1:
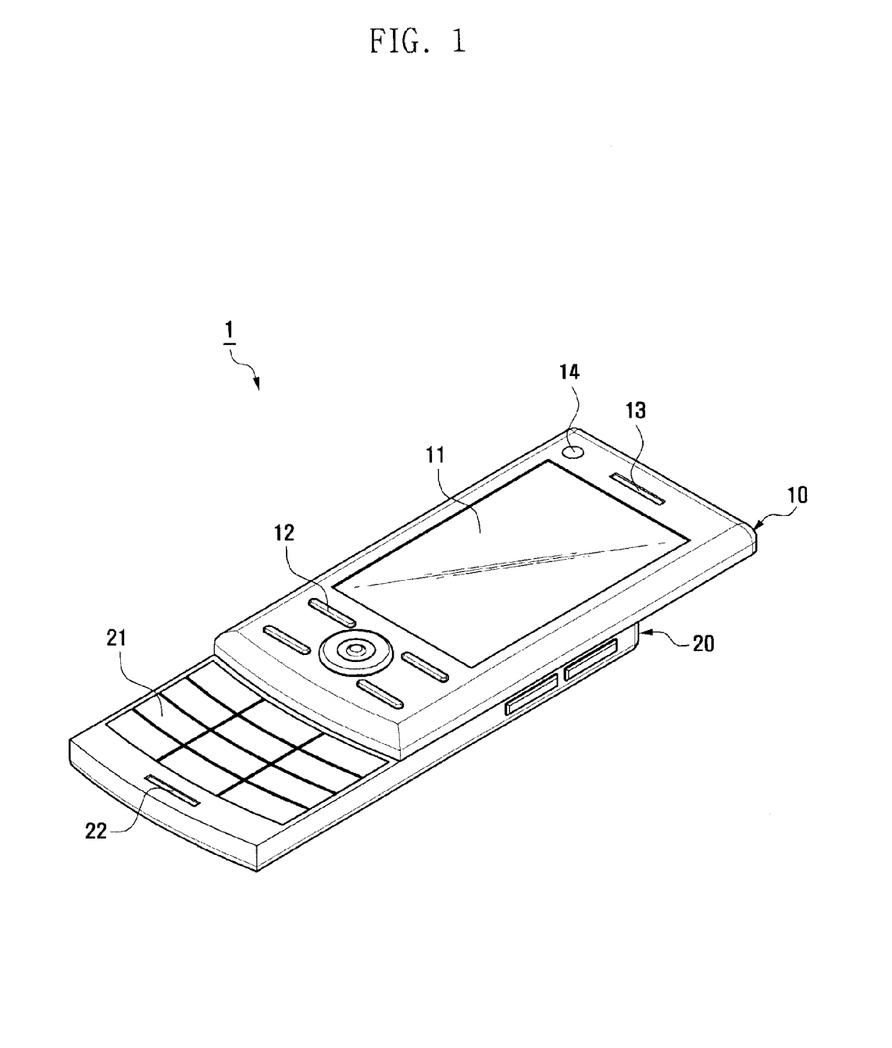
FIG. 1 is a perspective view illustrating a mobile terminal having a FPCB according to an exemplary embodiment of the present invention.
Figure 2:
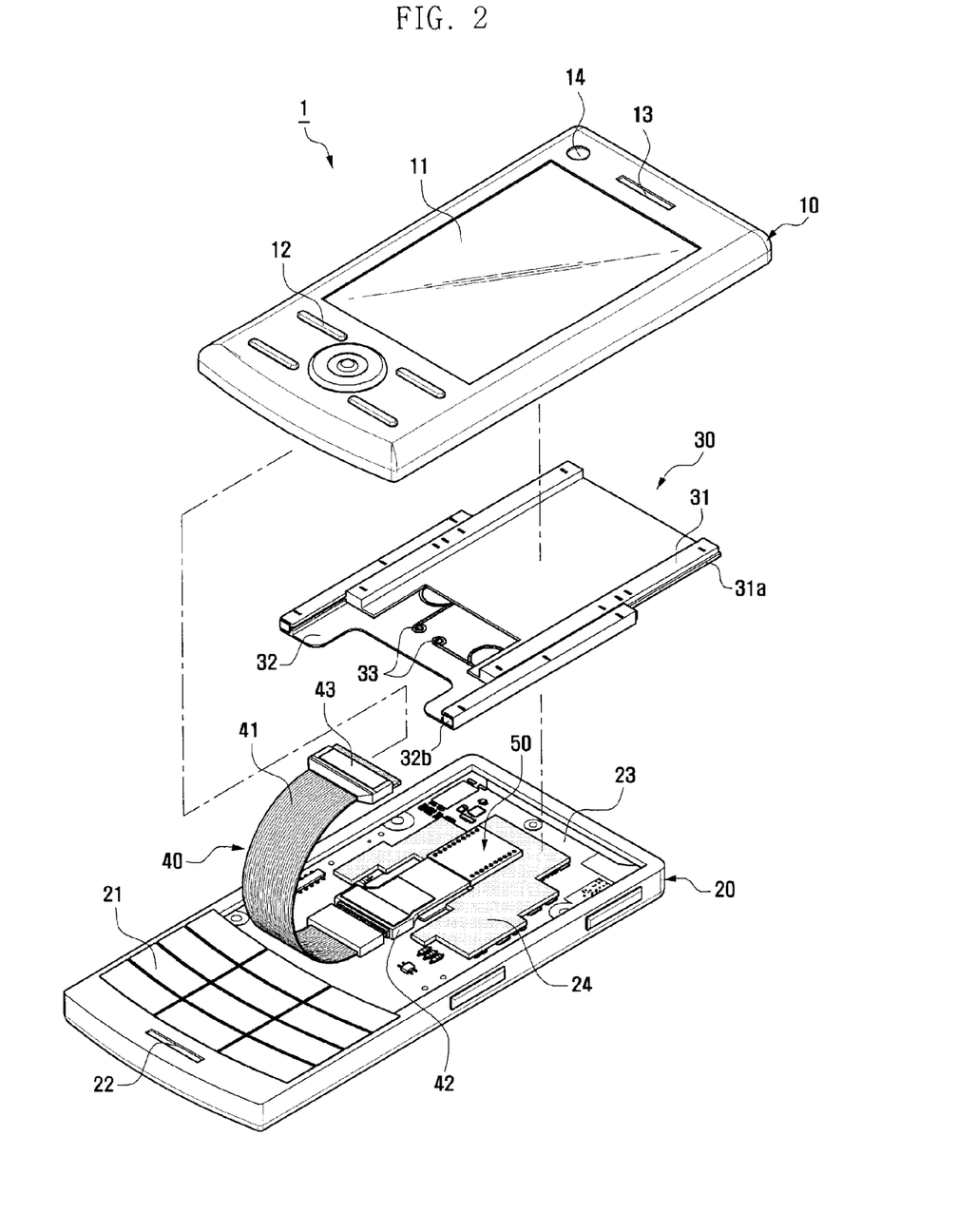
FIG. 2 is an exploded perspective view illustrating a configuration of the mobile terminal of FIG. 1.
Figure 3A:
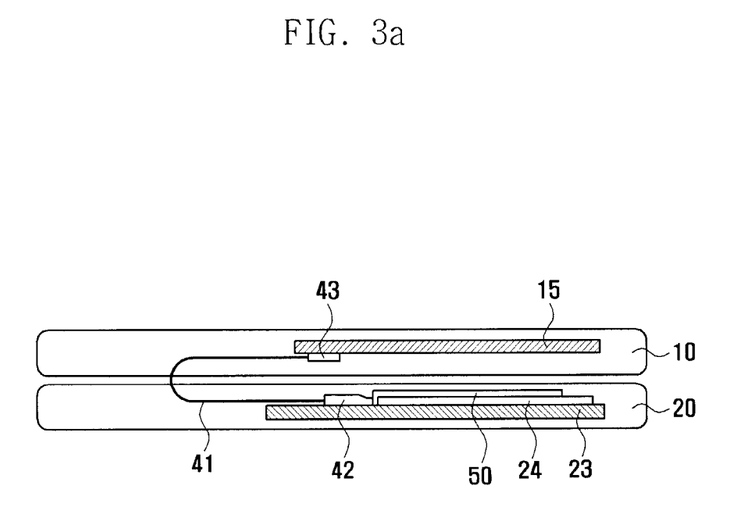
FIGS. 3a and 3b are side views illustrating a configuration of the mobile terminal of FIG. 1.
Figure 3B:
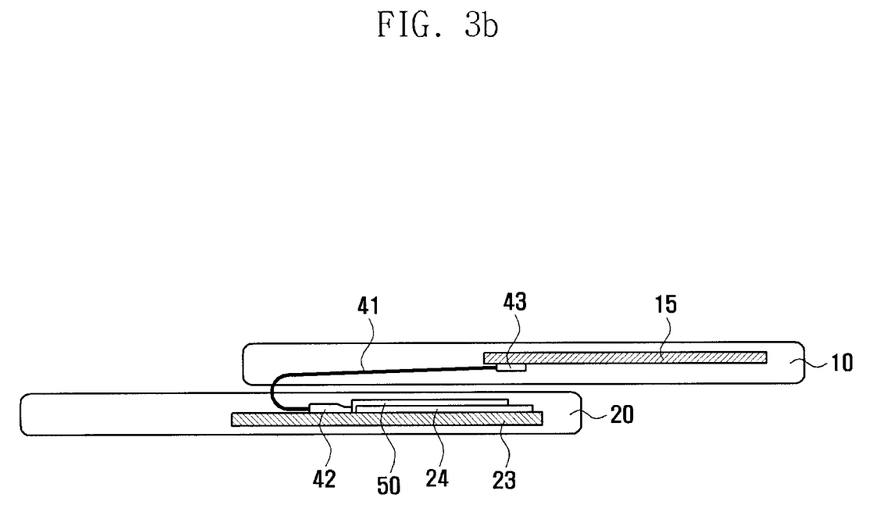

FIG. 1 is a perspective view illustrating a mobile terminal having a FPCB according to an exemplary embodiment of the present invention, FIG. 2 is an exploded perspective view illustrating a configuration of the mobile terminal of FIG. 1, and FIGS. 3a and 3b are side views illustrating a configuration of the mobile terminal of FIG. 1.

Referring now to FIG. 1, a general slide type mobile terminal 1 includes an upper case 10 having a display unit 11 and a lower case 20 having a key input unit 21 on a front surface thereof. The upper case 10 can move relative to the lower case in an extended or retracted position (or a position there between) by a sliding movement on the lower case 20.

The display unit 11 provides a function of a user interface for outputting a desired screen to a user or for receiving (and/or displaying) an instruction from the user. The display unit 11 is preferably formed as a liquid crystal display (LCD) or organic light emitting diodes (OLED). However, virtually any thin-film screen technology may also be used.

The key input unit 21 for receiving a manipulation instruction from the user is preferably formed in an upper surface of the lower case 20, and when the upper case 10 is positioned away from the lower case 20 by a sliding movement, at least a portion of the lower case 20 is exposed to the outside. The key input unit 21 is formed in a form of a keypad or a key button. A person of ordinary skill in the art understands and appreciates that the display 11 may also double as a touch screen input for certain designated functions of the device.

FIG. 1 illustrates an example where an auxiliary key input unit 12 for receiving a manipulation instruction from the user is formed in a lower end portion of the upper case 10, i.e. in a lower end portion of the display unit 11. However an entire upper surface of the upper case 10 can be formed with the display unit 11. The auxiliary key input unit 12 is formed in a lower end portion or a side surface of the upper case 10, and when the upper case 10 and the lower case 20 are coupled, the auxiliary key input unit 12 is preferably formed with a minimum of function keys such as a power source key for turning on/off power of the mobile terminal 1 in order to perform an input action of the user, communication key for performing communication with another party, and direction key for selecting menus displayed on the display unit 11.

As shown in FIG. 1, the mobile terminal 1 preferably includes an earpiece 13 provided in an upper end portion of the upper case 10 for outputting a sound signal and a mouthpiece 22 provided in a lower end portion of the lower case 20 for inputting a sound signal. The user can hear a sound signal received from another party using the earpiece 13 and transmit a sound signal to another party using the mouthpiece 22. Further, the mobile terminal 1 preferably includes a camera unit 14 for photographing a subject in front of the mobile terminal 1, or for performing audiovisual communication in an upper end portion of the upper case 10.

As shown in FIG. 2, a sliding hinge 30 for guiding the upper case 10 to perform a sliding movement on the lower case 20 is provided between the upper case 10 and the lower case 20. The sliding hinge 30 includes a first sliding member 31 connected to a lower surface of the upper case 10, a second sliding member 32 connected to an upper surface of the lower case 20, and a hinge portion 33 installed between the first sliding member 31 and the second sliding member 32. In order to guide a sliding movement of the upper case 10, a long-formed projection is provided in a moving direction of the upper case 10 in both side surfaces of the first sliding member 31, and a groove 32b formed long to insert a projection 31a of the first sliding member 31 is provided in both side surfaces of the second sliding member 32. The hinge portion 33 has an elastic member such as a compression spring for providing an elastic force so that the upper case 10 automatically or semi-automatically performs a sliding movement according to a position thereof. A structure of the sliding hinge 30 shown in FIG. 2 is an illustration one of possible example, and the presently claimed invention is not limited thereto and can be changed by a person of ordinary skill in the art.

Referring now to FIGS. 3a and 3b, a first electronic circuit board 23 is mounted within the lower case 20, and a second electronic circuit board 15 is mounted within the upper case 10. Various function modules such as the display unit 11 and the camera unit 14 that can be mounted in the upper case 10 are electrically connected to the second electronic circuit board 15 mounted within the upper case 10, and receive an electrical signal from the first electronic circuit board 23 mounted within the lower case 20, and said units are controllable by the electrical signal. The first electronic circuit board 23 and the second electronic circuit board 15 have an substantially thin-plate shape and include wirings for connecting various electronic components and the first electronic circuit board 23 and the second electronic circuit board 15 in an upper surface thereof. The electronic components are various kinds of elements such as a modem chip. Preferably, the first electronic circuit board 23 and the second electronic circuit board 15 can be comprised of a printed circuit board (PCB).

When the mobile terminal 1 is in operation, noise is generated from various electronic components mounted in the first electronic circuit board 23 of the lower case 20. Here, the term "noise" indicates noise generating when data are output from the display unit 11 or the camera unit 14, noise by a power source, and noise radiated from an antenna portion (not shown) and radiated by being coupled to the upper case, etc. Therefore, a noise shielding portion 24 for shielding such noise is installed in an upper surface of the first electronic circuit board 23. Preferably, a shield can is used as the noise shielding portion 24, as shown in FIG. 2. Electromagnetic interference (EMI) paint is painted onto a surface of the shield can. The noise shielding portion 24 is separated by a predetermined gap from electronic components and a shape thereof is determined according to a kind and disposition of the structure of electronic components mounted in the first electronic circuit board 23.

As described above, and in view of FIG. 2 in particular, various functional modules, such as the display unit 11 and the camera unit 14, are connected to the second electronic circuit board 15 and receive an electrical signal from the first electronic circuit board 23 and are controlled by the electrical signal. In order to transmit and receive various electrical signals by connecting the first electronic circuit board 23 and the second electronic circuit board 15, a FPCB 40 is preferably used. In general, the FPCB 40 comprises a flexible printed circuit board in which a minute circuit is printed in a thin plate film of a flexible plastic material.

The mobile terminal 1 having the FPCB 40 according to the present exemplary embodiment includes a ground extension portion 50 connected at one end of the FPCB 40 connected to the first electronic circuit board 23, and having a ground layer connected to a ground line of the FPCB 40 therein, and connected to the noise shielding portion 24 for shielding noise generating from electronic components mounted on the first electronic circuit board 23.

Figure 4:
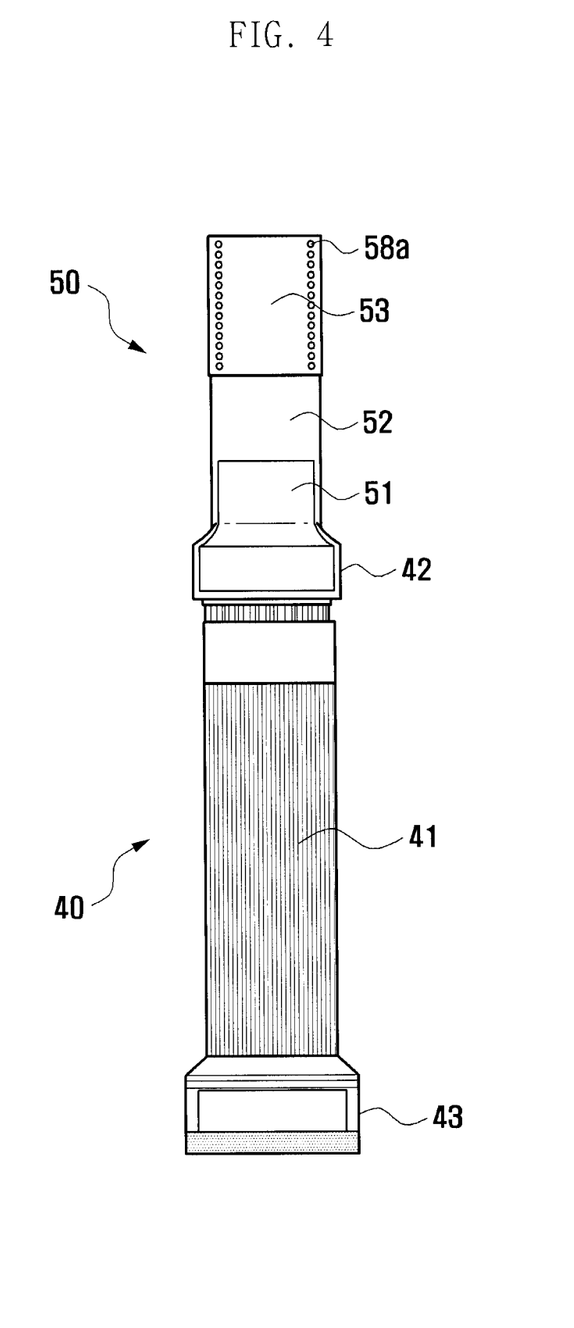
FIG. 4 is a plan view illustrating a structure of a ground extension portion connected to a FPCB in the mobile terminal of FIG. 1.

FIG. 4 is a plan view illustrating an exemplary structure of a ground extension portion connected to an FPCB in the mobile terminal of FIG. 1.

Referring now to FIG. 4, the FPCB 40 is formed in a plurality of layers and includes an FPCB connection portion 41 having a plurality of data lines, power supply lines, and ground lines (not shown) therein, and a first connector 42 and second connector 43 formed at both ends of the FPCB connection portion 41 to connect the first electronic circuit board 23 and the second electronic circuit board 15, respectively. In other words, the FPCB connection portion 41 performs a function of a communication path for transmitting and receiving a power source, various control signals, and a data signal by connecting (i.e. electrically coupling) the first electronic circuit board 23 and the second electronic circuit board 15. Both end portions of a ground line of the FPCB connection portion 41 are connected to the ground of the first electronic circuit board 23 and the ground of the second electronic circuit board 15, respectively. The data line, power supply line, and ground line of the FPCB connection portion 41 are formed with a copper conductor. Although not shown in FIG. 4, the first connector 42 and the second connector 43 are each preferably formed with a header and a socket including a plurality of terminals. In order to minimize an influence due to static electricity generating when the first connector 42 and the second connector 43 are coupled to the first electronic circuit board 23 and the second electronic circuit board 15, respectively, EMI paint is painted on a ground surface of the first connector 42 and the second connector 43. The FPCB 40 can be variously formed according to the conditions typically used. In addition, a sectional structure thereof is well-known and therefore a detailed description thereof is omitted.

As shown in FIG. 4, the ground extension portion 50 is preferably connected to one end of the FPCB 40 that is connected to the first electronic circuit board 23 and has a ground layer (54a of FIG. 6) connected to a ground line of the FPCB 40 therein, and a first extension portion 51, second extension portion 52, and third extension portion 53 are formed in a length direction from one end of the FPCB 40.

The first extension portion 51 preferably is connected to the first connector 42 for connecting the FPCB 40 and the first electronic circuit board 23. The third extension portion 53 is grounded in the noise shielding portion 24 in order to extend the ground of the FPCB 40. The second extension portion 52 connects the first extension portion 51 and the third extension portion 53 therebetween. The third extension portion 53 is made of a hard material that is made for being grounded in the noise shielding portion 24, and the first extension portion 51 and the second extension portion 52 are made of a flexible material in order to prevent damage from folding due to the third extension portion 53 of a hard material when connecting the ground extension portion 50. Sectional structures of the first extension portion 51 to the third extension portion 53 have a substantially equal ground layer (54a of FIG. 6) therein, however there can be a difference in a surface treatment. This is described in detail with reference to FIG. 6.

A structure of the ground extension portion 50 shown in FIG. 4 is an exemplary illustration and can be changed according to particular conditions such as a form and a ground position of a noise shielding portion for the ground.

Figure 5:
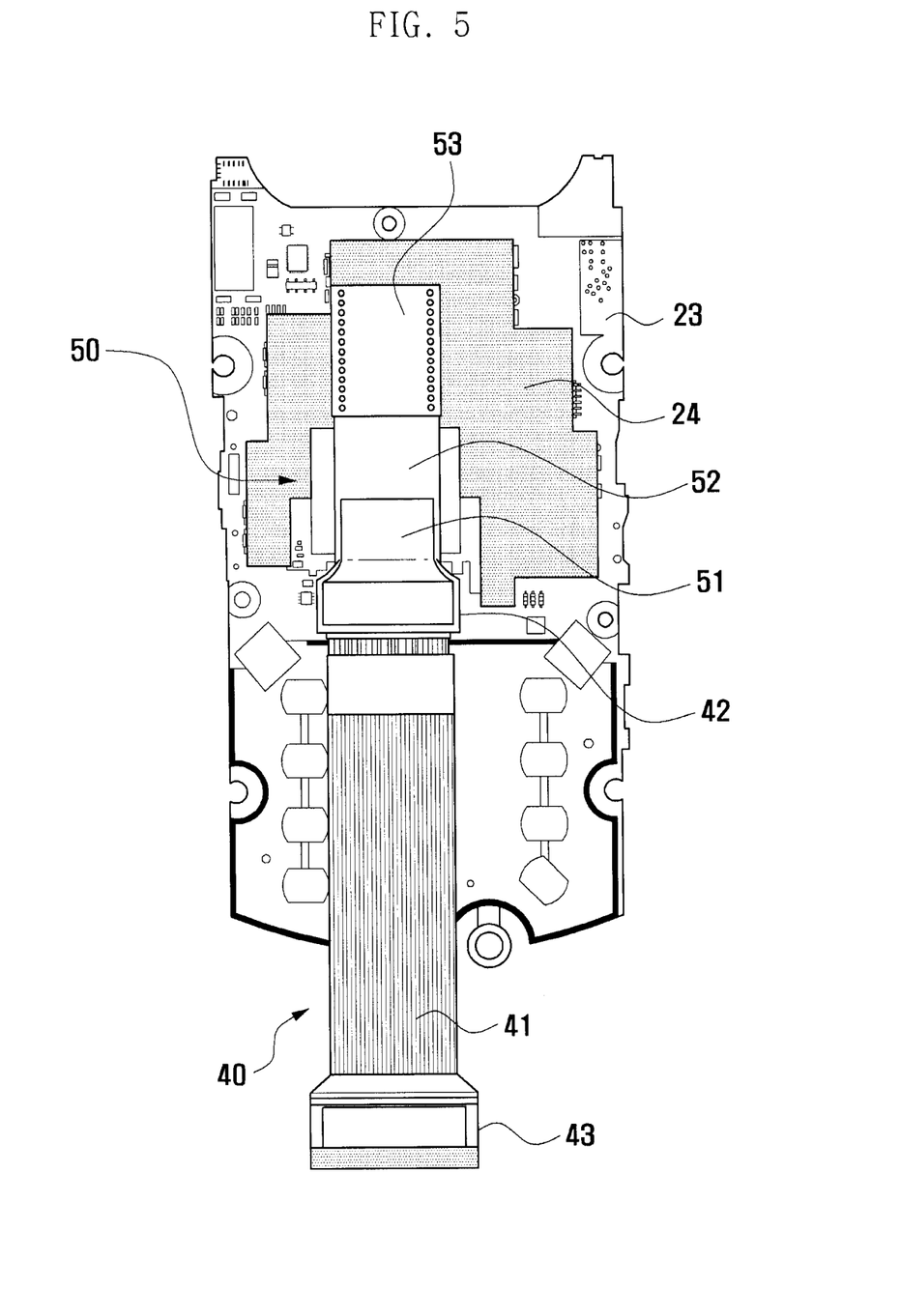
FIG. 5 is a view illustrating a state in which a ground extension portion connected to a FPCB is connected to a noise shielding portion of a first electronic circuit board in the mobile terminal of FIG. 1.

FIG. 5 is a view illustrating a state in which a ground extension portion connected to a FPCB is connected to a noise shielding portion of a first electronic circuit board in the mobile terminal of FIG. 1.

Referring now to FIG. 5, one end of the FPCB 40 is electrically connected to the first electronic circuit board 23 through the first connector 42, and the other end of the FPCB 40 is electrically connected to the second electronic circuit board 15 through the second connector 43. The ground extension portion 50 is connected to the first connector 42 through the first extension portion 51 and is grounded in a shield can, which is the noise shielding portion 24 through the third extension portion 53. Therefore, according to the present invention, by bypassing noise and ESD surge that are transferred through the FPCB 40 to the noise shielding portion 24 through the ground extension portion 50, the ground can be extended.

Figure 6:
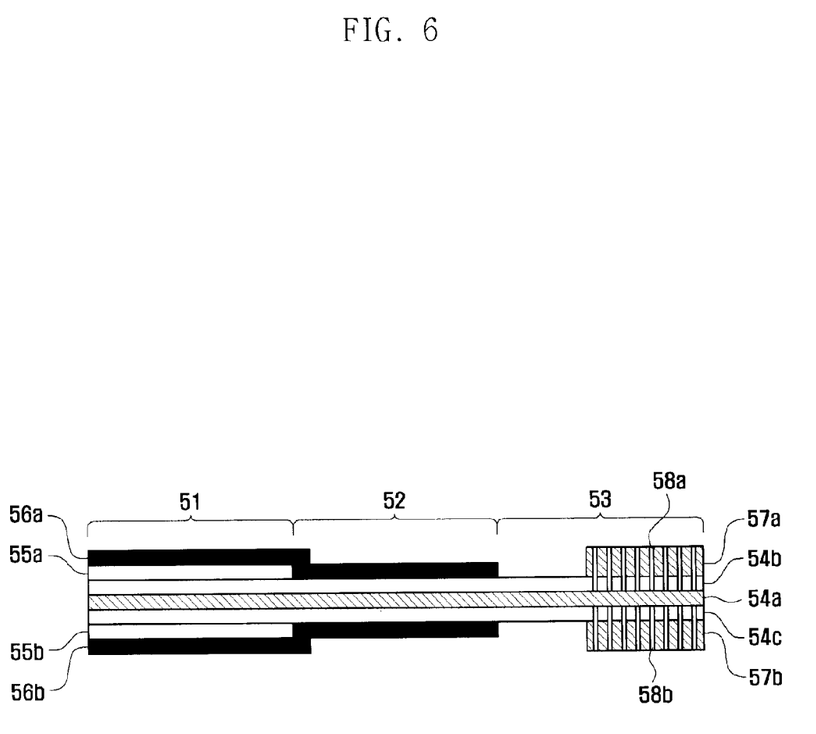
FIG. 6 is a cross-sectional view illustrating a sectional structure of a ground extension portion connected to a FPCB in the mobile terminal of FIG. 1.

FIG. 6 is a cross-sectional view illustrating a sectional structure of a ground extension portion connected to a FPCB in the mobile terminal of FIG. 1.

Referring now to FIG. 6, a ground layer 54a is formed within the ground extension portion 50 including a first extension portion 51, second extension portion 52, and third extension portion 53. The ground layer 54a is formed a conductive (e.g. copper) foil layer. A cover lay or polyimide (PI) film layers 54b and 54c are formed in an upper surface and a lower surface of the ground layer 54a.

As shown in FIG. 6, nano coating layers 55a and 55b are formed in an upper surface or a lower surface of the first extension portion 51. The nano coating layers 55a and 55b are formed in a thin-film form by spraying nano particles such as gold (Au) and silver (Ag) having excellent conductivity. Because the nano coating layers 55a and 55b have an excellent static electricity discharge shielding function, the nano coating layers 55a and 55b prevent static electricity discharge phenomenon generating in the first connector 42 connected to the first extension portion 51 from damaging various electronic components mounted in the first electronic circuit board 23. In the present exemplary embodiment, while a specific example of forming a nano coating layer is described, a person of ordinary skill in the art should understand and appreciate that a nano coating layer can be made of any material having excellent conductivity.

Furthermore, in an upper surface or a lower surface of the first extension portion 51, or in an upper surface or a lower surface of the second extension portion 52, EMI paints 56a and 56b are painted to minimize an influence due to static electricity and to secure the ground, as in the first connector 42 to which the FPCB 40 is connected.

As shown in FIG. 6, in order to ground the third extension portion 53 and the noise shielding portion 24, conductive (e.g. copper) foil coating layers 57a and 57b are formed in a portion grounded in the noise shielding portion 24 of an upper surface or a lower surface of the third extension portion 53. Although not shown in FIG. 6, by forming a gold (Au) coating layer and a copper (Cu) plating layer in an upper surface or a lower surface of the third extension portion 53, the copper foil coating layers 57a and 57b are preferably formed. A portion in which the copper foil coating layers 57a and 57b are formed in an upper surface or a lower surface of the third extension portion 53 is a portion grounded in the noise shielding portion 24, and the copper foil coating layers 57a and 57b can be formed, for example in a portion or in the entire of an upper surface or a lower surface of the third extension portion 53. The copper foil coating layers 57a and 57b are bonded to the cover lay or a PI film layer formed in an upper surface and a lower surface of the ground layer 54a using interlayer adhesives (not shown).

As shown in FIG. 6, the copper foil coating layers 57a and 57b are connected to the ground layer 54a through a plurality of via holes 58a and 58b having a metal filling material therein. The plurality of via holes 58a and 58b are formed to penetrate through the copper foil coating layers 57a and 57b formed in an upper surface or a lower surface of the third extension portion 53 and the ground layer 54a within the third extension portion 53, and the ground layer 54a and the copper foil coating layers 57a and 57b are electrically connected through a metal filling material. Therefore, the noise and ESD surge transferred through the FPCB 40 can be bypassed to the noise shielding portion 24 through the copper foil coating layers 57a and 57b.

A sectional structure of the ground extension portion 50 shown in FIG. 6 is an exemplary illustration, and the presently claimed invention is not limited thereto and a sectional structure of the ground extension portion 50 can be varied in form by a person of ordinary skill in the art. For example, FIG. 6 illustrates an example where EMI paints 56a and 56b are painted in an upper surface and a lower surface of the first extension portion 51 and an upper surface and a lower surface of the second extension portion 52, however the EMI paint may be painted in only an upper surface or a lower surface of the first extension portion 51, and painting of the EMI paint may be omitted.

As described above, in the present invention, a slide type mobile terminal 1 is exemplified, however a form of the mobile terminal 1 is not limited thereto. That is, the present invention can be applied to various forms of mobile terminals using a FPCB in order to connect the first electronic circuit board and the second electronic circuit board, such as a slide type mobile terminal, folder-type mobile terminal, rotating-type mobile terminal, or a combination-type mobile terminal thereof.

As described above, in a mobile terminal having a FPCB according to an exemplary embodiment of the present invention, by connecting a ground extension portion extended from one end of a FPCB connected to an electronic circuit board to a noise shielding portion installed in the electronic circuit board, the ground can be extended and an influence of noise and static electricity have on electronic components mounted on the electronic circuit board can be minimized. Further, radiation performance and ESD performance of the mobile terminal can be improved by the structure. Further, because the ground can be extended by the structure of the invention, a production cost of the mobile terminal can be reduced. The effects of the present invention are not limited to the above-described effects and the other objects will be understood by those skilled in the art from the following description.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A mobile terminal having a flexible printed circuit board (FPCB), comprising:
    a first main body having a first electronic circuit board arranged therein;
    a second main body slidably connected to the first main body and having a second electronic circuit board arranged therein;
    a FPCB electrically coupling the first electronic circuit board and the second electronic circuit board for transferring an electronic signal there between;
    a noise shielding portion for shielding noise generated from one or more electronic components mounted on the first electronic circuit board;
    a ground extension portion in contact with one end of the FPCB electrically coupled to the first electronic circuit board, said ground extension portion having a ground layer connected to a ground line of the FPCB therein, and
    wherein the ground extension portion is arranged on the noise shielding portion and in contact with the noise shielding portion to extend the ground.

2. The mobile terminal of claim 1, wherein the ground extension portion comprises:
    a first extension portion having a first end connected to a first connector for electrically coupling the FPCB and the first electronic circuit board;
    a second extension portion having a first end connected to a second end of the first extension portion; and
    a third extension portion having a first end connected to a second end of the second extension portion and having the second end grounded in the noise shielding portion.

3. The mobile terminal of claim 2, wherein conductive foil coating layers are formed in a portion grounded in the noise shielding portion of one of an upper surface and a lower surface of the third extension portion.

4. The mobile terminal of claim 3, wherein the conductive foil comprises copper foil.

5. The mobile terminal of claim 3, wherein the conductive foil coating layers are connected to the ground layer through a plurality of via holes having a metal filling material therein.

6. The mobile terminal of claim 2, wherein nano coating layers are formed in one of an upper surface and a lower surface of the first extension portion.

7. The mobile terminal of claim 2, wherein Electro Magnetic Interference (EMI) paints are coated on one of an upper surface and a lower surface of the first extension portion, respectively.

8. The mobile terminal of claim 2, wherein Electro Magnetic Interference (EMI) paints are coated on one of an upper surface and a lower surface of the second extension portion, respectively.

9. The mobile terminal of claim 1, wherein one of a cover lay and a polyimide (PI) film layer is formed in at least one of an upper surface and a lower surface of the ground layer.

10. The mobile terminal of claim 1, wherein the noise shielding portion is formed with a shield can.

11. The mobile terminal of claim 1, further comprising a sliding hinge for guiding an upper case to perform a sliding movement on a lower case, said sliding hinge being provided between the upper case and the lower case.

12. The mobile terminal of claim 11, wherein the sliding hinge includes a first sliding member connected to a lower surface of the upper case, a second sliding member connected to an upper surface of the lower case, and a hinge portion installed between the first sliding member and the second sliding member.

13. The mobile terminal of claim 12, further comprising: a long-formed projection being provided in a moving direction of the upper case in both side surfaces of the first sliding member, and a groove formed long for inserting a projection of the first sliding member being provided in both side surfaces of the second sliding member.

14. The mobile terminal of claim 12, wherein the hinge portion comprises an elastic member for providing an elastic force on the upper case for automatically or semi-automatically performing a sliding movement according to a position thereof.

15. The mobile terminal of claim 14, wherein the elastic member comprises a spring.

16. The mobile terminal of claim 1, wherein said ground extension portion includes at least a first part comprised of a flexible material and another part comprised of a hard material in which said another part is in contact with and is grounded by the noise shielding portion to bypass noise and Electrostatic Discharge (ESD) surge to the noise shielding portion through the ground extension portion.

17. A mobile terminal comprising:

a first main body having a first electronic circuit board arranged therein;

a second main body movably connected to the first main body and having a second electronic circuit board arranged therein;

a FPCB electrically coupling the first electronic circuit board and the second electronic circuit board for transferring an electronic signal there between;

a noise shielding portion for shielding noise generated from one or more electronic components mounted on the first electronic circuit board;

a ground extension portion in contact with one end of the FPCB electrically coupled to the first electronic circuit board, said ground extension portion having a ground layer connected to a ground line of the FPCB therein; and wherein the ground extension portion is arranged on the noise shielding portion and in contact with the noise shielding portion to extend the ground, and wherein the mobile terminal comprises one of a folder-type mobile terminal, rotating-type mobile terminal, or a combination-type mobile terminal thereof.

18. The mobile terminal of claim 17, wherein said ground extension portion includes at least a first part comprised of a flexible material and another part comprised of a hard material in which said another part is in contact with and is grounded by the noise shielding portion to bypass noise and Electrostatic Discharge (ESD) surge to the noise shielding portion through the ground extension portion.

* * * * *

UNITED STATES PATENT AND TRADEMARK OFFICE
CERTIFICATE OF CORRECTION

| | | |
|---|---|---|
| PATENT NO. | : 8,532,696 B2 | Page 1 of 1 |
| APPLICATION NO. | : 12/755604 | |
| DATED | : September 10, 2013 | |
| INVENTOR(S) | : In Taek Lee et al. | |

It is certified that error appears in the above-identified patent and that said Letters Patent is hereby corrected as shown below:

In the Claims:

Column 8, Claim 5, Line 51 should read as follows:
--...a plurality of holes having...--

Signed and Sealed this
Twelfth Day of November, 2013

Teresa Stanek Rea
*Deputy Director of the United States Patent and Trademark Office*